March 22, 1927.
A. F. KLASING
1,621,843
BRAKE MECHANISM
Filed Jan. 22, 1923
2 Sheets-Sheet 1
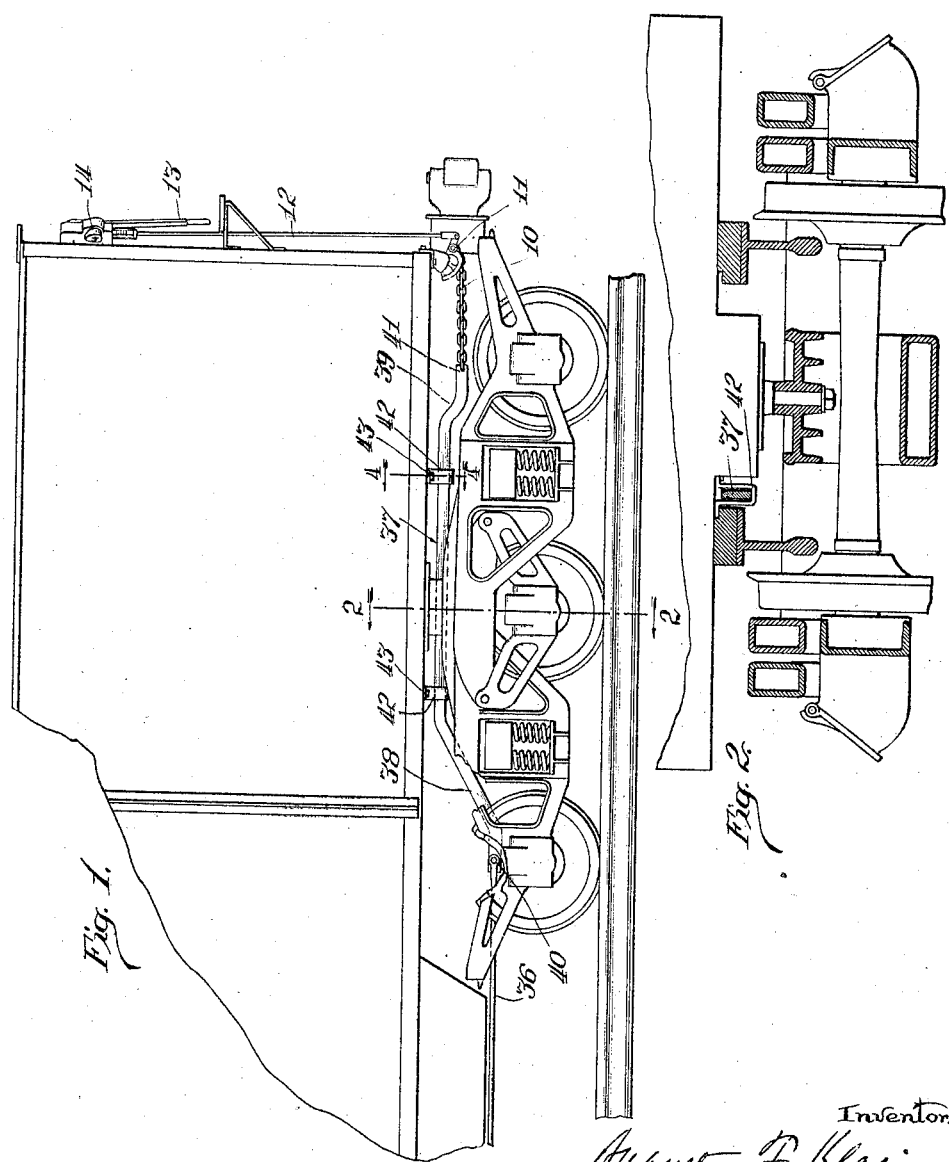

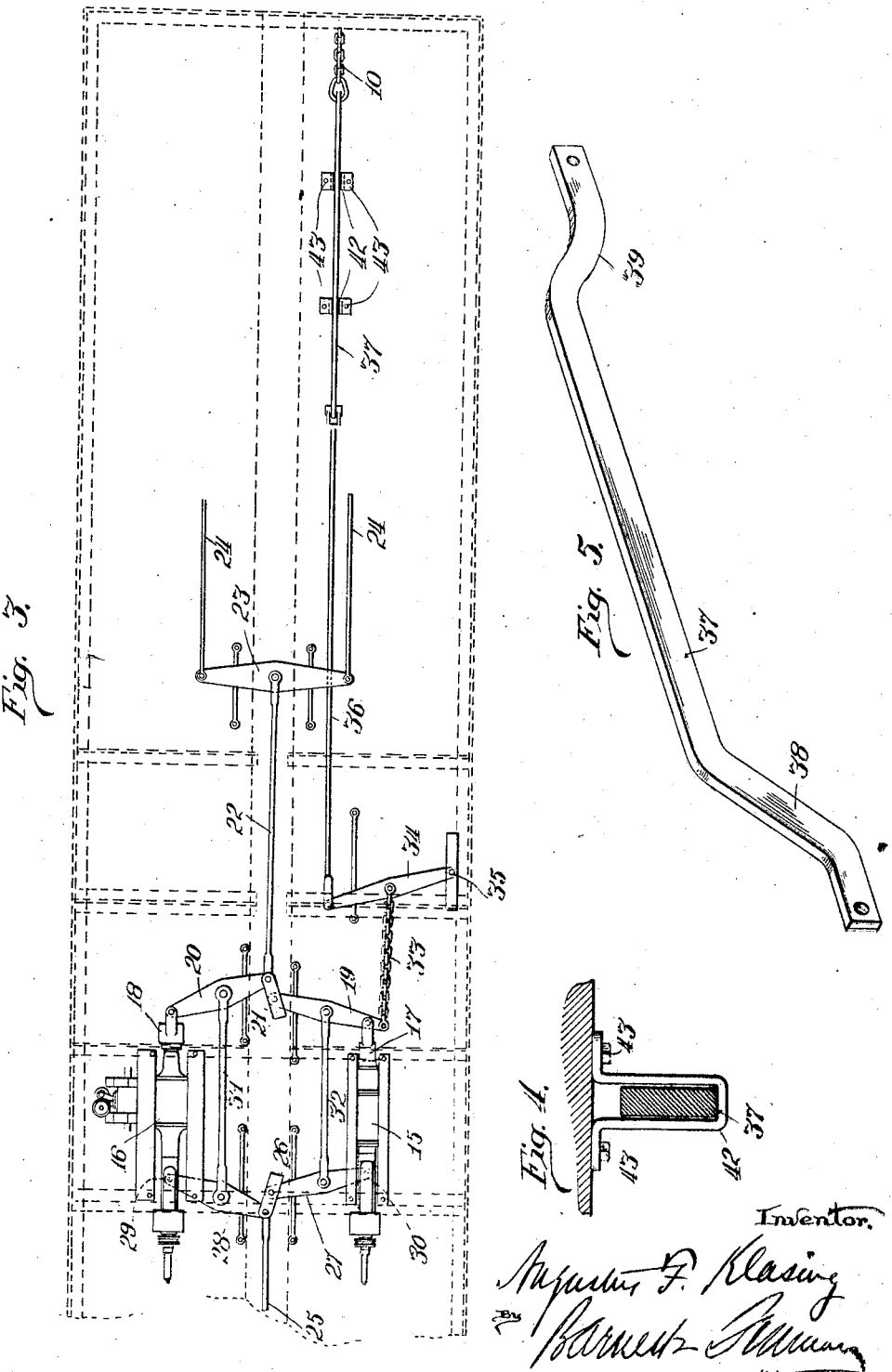

Patented Mar. 22, 1927.

1,621,843

UNITED STATES PATENT OFFICE.

AUGUSTUS F. KLASING, OF CHICAGO, ILLINOIS, ASSIGNOR TO THE KLASING CAR BRAKE COMPANY, A CORPORATION OF COLORADO.

BRAKE MECHANISM.

Application filed January 22, 1923. Serial No. 614,199.

My invention relates to a manually operated braking apparatus for railway cars adapted for installation in connection with the usual air brake system for use particularly in switching the car in making up a train or for braking the car at other times when air is not available for operating the air brake system.

The principal object of the invention is to simplify and improve the mechanism under the car for transmitting the pull on the chain taken up by operation of the manually operated device to the system of levers, pull rods, chains and the like which are actuated, either by the brake cylinders or by the manually operated device, as the case may be, to force the brake shoes against the wheels of the car; the invention having in view particularly a mechanism which can be used on certain types of cars that are constructed so that the clearances between the car body and the trucks are small. In cars of this type it has been customary to employ an apparatus for connecting the hand braking device with the links and levers of the air brake system comprising a pull rod along one side of the car, a sheave at the corner of the car and a chain extending around said sheave and winding upon the end of the brake mast or attached to some other form of device for setting the brakes by hand. This apparatus is heavy, complicated and more or less expensive to manufacture and install. My invention provides a much simplified form of transmission mechanism in which the main pull rod and the take up chain, instead of being arranged along the side and around the end of the car, are in line with each other and in substantial alignment with the hand operated device on the end of the car.

The invention is illustrated, in a preferred embodiment, in the accompanying drawings wherein—

Fig. 1 is a fragmentary side elevation of a freight car of the gondola type provided with the hand braking apparatus of my invention.

Fig. 2 is a sectional view, on line 2—2 of Fig. 1.

Fig. 3 is a plan view of the parts of the brake mechanism arranged under the car, the car body, in this figure, being shown in dotted lines.

Fig. 4 is a sectional view on line 4—4 of Fig. 1, and

Fig. 5 is a view, in perspective, of one element of the hand brake transmission mechanism.

I have shown the braking apparatus of my invention illustrated in connection with a gondola car of somewhat recent construction, but it will be understood that the use of the invention is not limited to this particular type of car. For take-up of the chain by means of which, in hand braking, the brake shoes are pressed against the brake wheels, I have shown, for purposes of illustration, a mechanism substantially as disclosed in my Patent No. 1,420,554, granted June 20, 1922 for apparatus for manipulating railway car brakes, but so far as the present invention is concerned any form of hand operated device might be used for this purpose in place of the device shown.

Referring to the embodiment of the invention shown in the accompanying drawings, 10 designates a chain, or other flexible element, which is connected with a system of levers, pull rods, links, etc., under the car which, when actuated, press the brake shoes against the car wheels. This chain is shown attached to a rocking member 11 upon which the chain winds when said member is rocked. The rocking of said member is accomplished by means of a longitudinally movable element 12 on the end of the car which is raised by means of a lever 13 and a mechanism (not shown) which is enclosed in the housing 14 into which element 12 projects.

Referring to Figs. 3, 15, 16 designate air cylinders the pistons 17, 18 of which are connected by levers 19 and 20, these levers being shown as connected by a link 21 to which is pivoted a pull rod 22 having an equalizing bar 23 to opposite ends of which are connected pull rods 24 which when moved in the direction toward the middle of the car actuate the levers that force the brake shoes against the wheels at one end of the car. 25 is a rod corresponding to rod 22 for operating the brake shoes at the other end of the car, this rod being connected to a link 26 which connects a pair of levers 27, 28 having fixed pivots on the car body at 29, 30. The levers 20, 28 are connected with a rod 31 and the levers 19, 27 with a rod 32.

Connected with one end of the lever 19 is a chain 33 which is anchored to the center point of a lever 34 pivoted at 35 to the car body. This lever has been used with previous constructions but in a reverse position, that is, with its inner end pivoted to the car body. In accordance with my invention the inner end of lever 34 has pivoted thereto a pull rod 36 to which is articulated a slide bar 37 (Fig. 5), the ends of which are preferably bent as shown at 38, 39. Rod 36 is articulated at 40, with the end 38 of the slide bar. The chain 10, which has been described as being taken up over the rocking member 11, is connected at 41 with the end 39 of the slide bar. The slide bar extends over the truck and, in the particular car construction illustrated in a general way in the drawings, the slide bar passes through a limited space of about 5″ x 6″ in width and height which is the only available clearance between car body and truck in line with the hand brake mechanism on the end of the car. The position of the latter is, of course, fixed by requirements of the Interstate Commerce Commission. The slide bar 37 is supported in stirrups 42, preferably two in number, these stirrups being bolted to the under side of the car body, as indicated at 43 in Fig. 4. The configuration of the slide bar and its position with respect to chain 10 and link 36 are such that when the brakes are set by hand, involving the take-up of chain 10, the slide rod is lifted out of contact with the bottom of the stirrups to reduce friction on the stirrups to a minimum. The rocking member 11 has a curved face on which the chain 10 bears as the member is rocked under influence of the rod 12. As will be noted the curved surface of said member 11 approaches the axis of rotation of this member so that as the brakes are tightened the chain 10 is drawn upwardly toward the bottom of the car, thereby raising the bar 37 and because of its particular configuration, raises the whole bar from its attachment with the rod 36 and clears the bottoms of the stirrups 42 so that all of the power applied by the handle 13 of the brake mechanism is utilized for setting the brakes and not for overcoming friction of the sliding member 37 in its stirrups 42.

It will be realized that my invention is not limited to the particular type of air brake mechanism detailed in part in Fig. 3. This particular type of air brake mechanism is shown simply for the purpose of illustrating the application of my improvement to a car provided with a common form of air brake system. It is also to be understood that I do not desire to be limited to the precise form of slide bar arched for passing the truck and for providing the lower disposed connections at its ends, except as this may be specifically claimed. By this construction, however, in which the arching of the bar is effected by edgewise bends in the heavy bar, a very efficient structure is attained.

I claim:

1. The combination with the body and trucks of a railway car, of a brake setting device on the end of the car, a flat bar bent edgewise into the form of an arch operatively connected at one end to said brake setting device, means engaging the intermediate portion of the bar for holding it slidably in position over the truck at one end of the car, and means operatively connecting the other end of said arched bar with the brake rigging for applying the brakes.

2. In combination with the body and trucks of a railway car, a manually operated brake setting device on the end of the car, mechanism arranged under the car between the trucks for applying the brake shoes to the car wheels, and means for transmitting power from said device to said mechanism comprising hangers on the under side of the car body at opposite sides of the truck and a longitudinally arranged slide bar supported by said hangers and formed and disposed so that when the brakes are being set the bar is raised slightly out of contact with the bottoms of the hangers.

3. In combination with the body and trucks of a railway car, a manually operated brake setting device on the end of the car comprising a chain and a member on which said chain is wound, mechanism arranged under the car between the trucks for applying the brake shoes to the wheels, a lever having a fixed pivot near one side of the car, a connection between the aforesaid brake shoe operating mechanism and said lever, a slide bar supported for movements longitudinally the car over one of said trucks, the ends of which are bent downwardly, a connection between the inner end of said lever and said slide bar, said connection, slide bar and chain being arranged substantially parallel to the longitudinal axis of the car and in line with said manually operated brake setting device.

AUGUSTUS F. KLASING.